US008969230B2

(12) United States Patent
Belchior et al.

(10) Patent No.: US 8,969,230 B2
(45) Date of Patent: Mar. 3, 2015

(54) CYCLIC PROCESS FOR ABSORPTION AND REGENERATION OF ACIDIC GASES

(75) Inventors: Jadson Cláudio Belchior, Belo Horizonte (BR); Geraldo Magela De Lima, Belo Horizonte (BR); Geison Voga Pereira, Belo Horizonte (BR); Rogério De Oliveira, Belo Horizonte (BR); Wellerson Fonseca Ribeiro, Belo Horizonte (BR); Fabrício Vieira De Andrade, Vespasiano (BR)

(73) Assignees: Universidade Federal de Minas Gerais, Belo Horizonte (BR); AMA Solucoes Technologicas (AMATECH), Nova Lima (BR)

( * ) Notice: Subject to any disclaimer, the term of this patent is extended or adjusted under 35 U.S.C. 154(b) by 466 days.

(21) Appl. No.: 13/256,439

(22) PCT Filed: Mar. 12, 2010

(86) PCT No.: PCT/BR2010/000075
§ 371 (c)(1),
(2), (4) Date: Dec. 7, 2011

(87) PCT Pub. No.: WO2010/102371
PCT Pub. Date: Sep. 16, 2010

(65) Prior Publication Data
US 2012/0093704 A1    Apr. 19, 2012

(30) Foreign Application Priority Data
Mar. 13, 2009 (BR) ..................................... 0903159
Mar. 5, 2010 (BR) .................... 0000220907705453

(51) Int. Cl.
*B01J 21/20* (2006.01)
*B01D 53/62* (2006.01)
*C04B 38/02* (2006.01)

(52) U.S. Cl.
CPC ................ *B01D 53/62* (2013.01); *C04B 38/02* (2013.01); *B01D 2251/306* (2013.01); *B01D 2251/402* (2013.01); *B01D 2251/404* (2013.01); *B01D 2253/104* (2013.01); *B01D 2257/302* (2013.01); *B01D 2257/404* (2013.01); *B01D 2257/504* (2013.01); *Y02C 10/04* (2013.01); *Y02C 10/08* (2013.01); *Y10S 502/514* (2013.01)
USPC ............................................. 502/20; 502/514

(58) Field of Classification Search
USPC ............................................. 502/20, 439, 514
See application file for complete search history.

(56) References Cited

U.S. PATENT DOCUMENTS

| 4,992,319 | A * | 2/1991 | Kurosawa et al. ............. 428/116 |
| 6,048,821 | A | 4/2000 | Demmel et al. |
| 6,074,984 | A | 6/2000 | Demmel et al. |
| 6,281,164 | B1 | 8/2001 | Demmel et al. |
| 7,247,601 | B1 | 7/2007 | Hills et al. |
| 2008/0236389 | A1 | 10/2008 | Leedy et al. |

FOREIGN PATENT DOCUMENTS

| DE | 10050906 | 4/2002 |
| JP | 56-130225 | 10/1981 |
| JP | 2003-071241 | 3/2003 |

OTHER PUBLICATIONS

Int'l Search Report for PCT/BR2010/000075, five pages, mailed Sep. 13, 2010.
Written Opinion for PCT/BR2010/000075, three pages, mailed Sep. 13, 2010.

* cited by examiner

*Primary Examiner* — Edward Johnson
(74) *Attorney, Agent, or Firm* — Nixon & Vanderhye PC

(57) ABSTRACT

The present invention describes the process of preparing ceramics for the absorption of ACIDIC gases, which worsen the greenhouse effect, that are released in combustion systems, or that are present in closed environments. In relation to carbon dioxide, principal target of the present invention, the process of absorption, transport, processing and transformation of the gas into other products is described. The process uses ceramic materials prepared through the solid mixture of one or more metallic oxides, with one or more binding agents and an expanding agent. The product generated can be processed and the absorbent system regenerated. The carbon dioxide obtained in the processing can be used as analytic or commercial carbonic gas, various carbamates and ammonium carbonate.

3 Claims, 8 Drawing Sheets

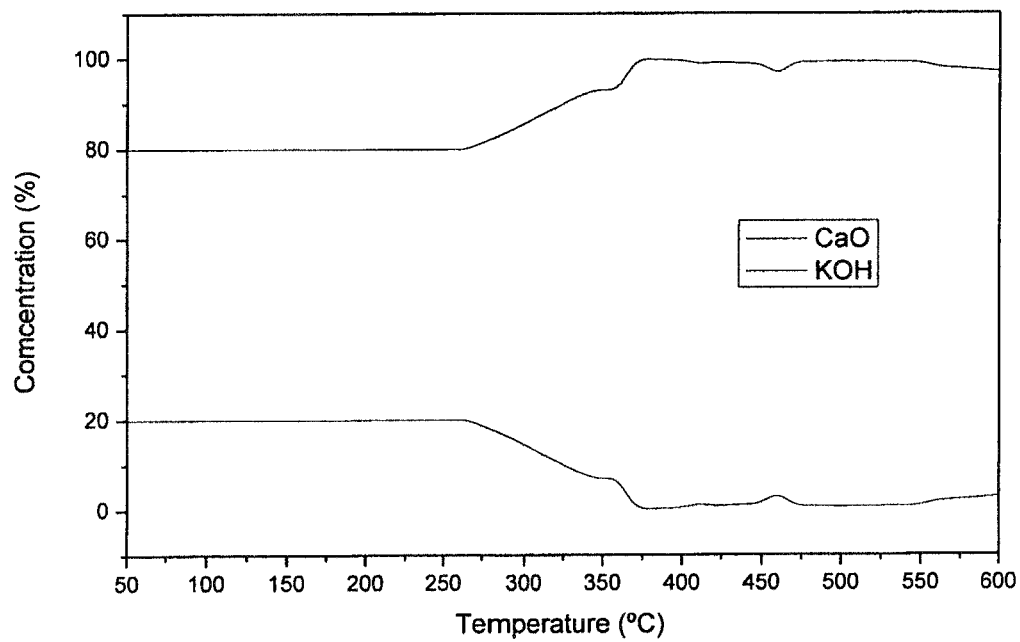
Figure 4 - Material 2 (CaO+KOH)
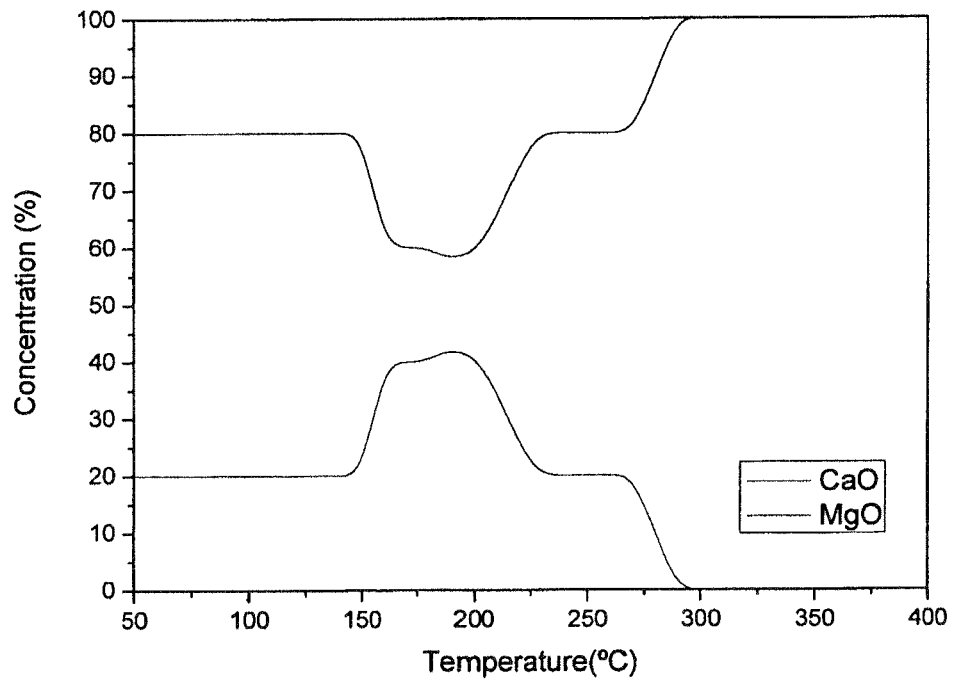
Figure 5 - Material 3 (CaO+MgO)

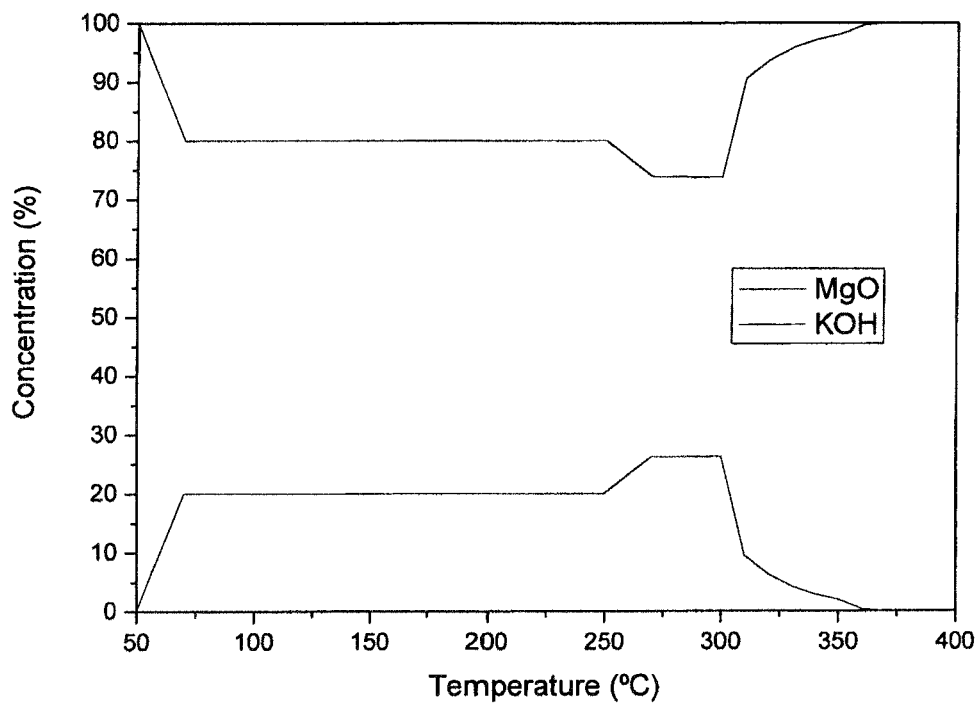
Figure 6 - Material 4 (MgO+KOH)
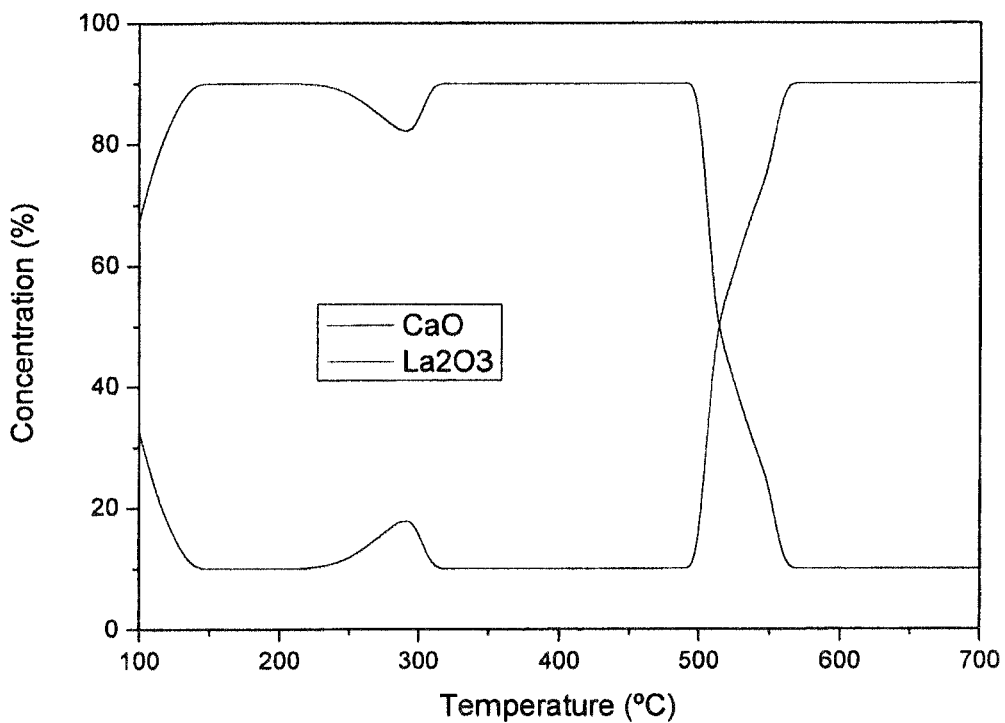
Figure 7 - Material 5 (Bentonite 10% +Cao +La2O3)

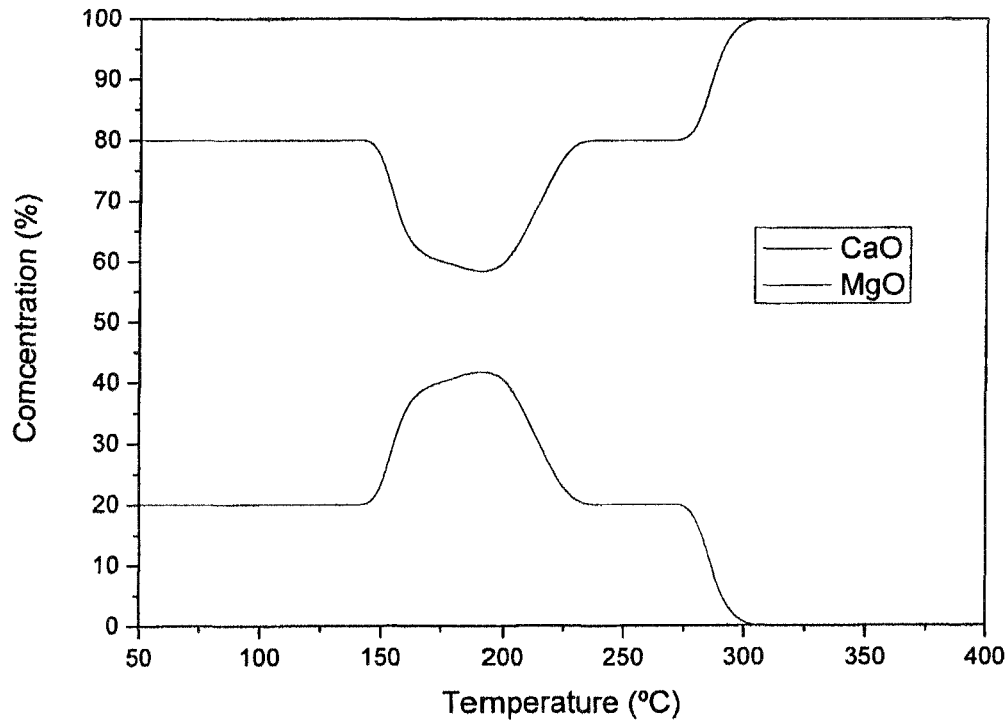
Figure 8 - Material 6: (Bentonite 10% +CaO + MgO)
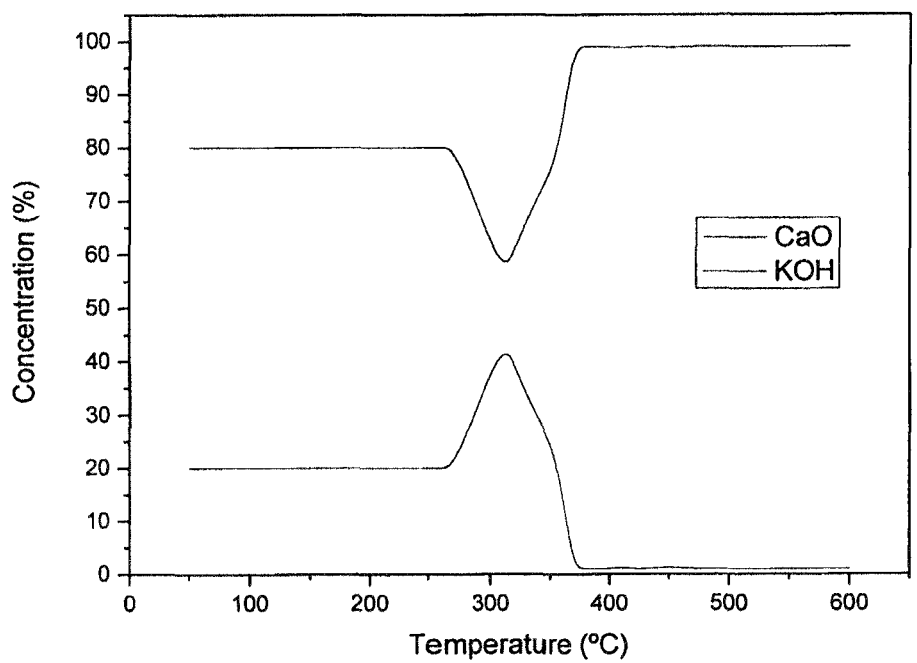
Figure 9 - Material 7 (Bentonite 10% + CaO +KOH)

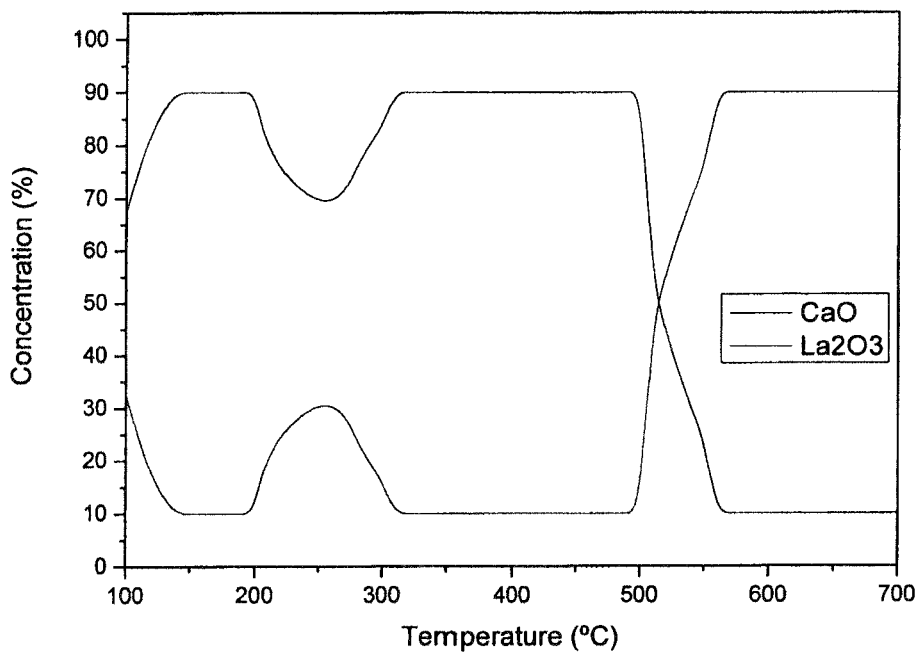
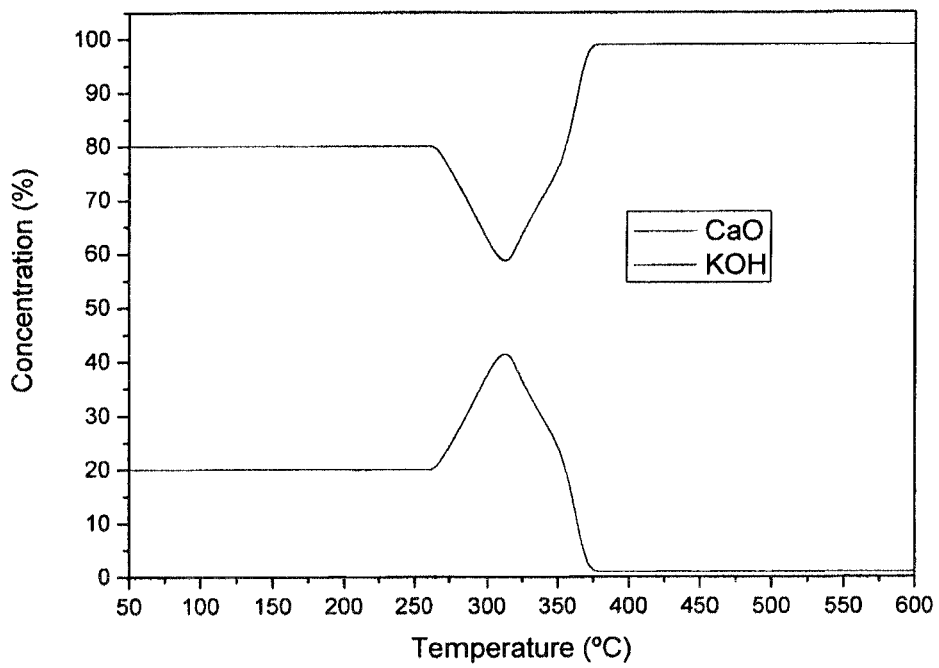

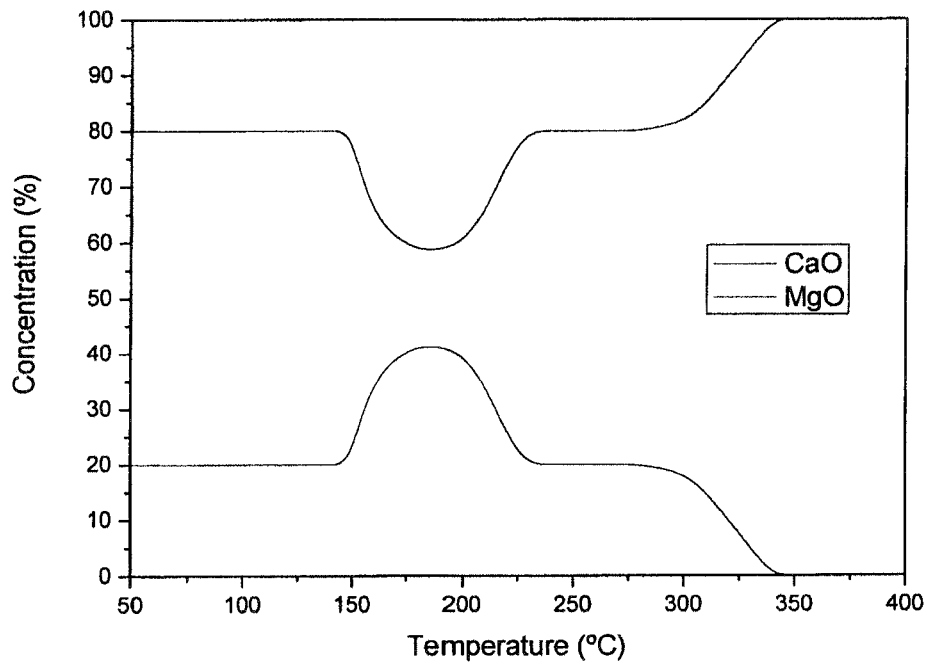
Figure 12 - Material 10 (kaolin 10% +Cao +MgO)
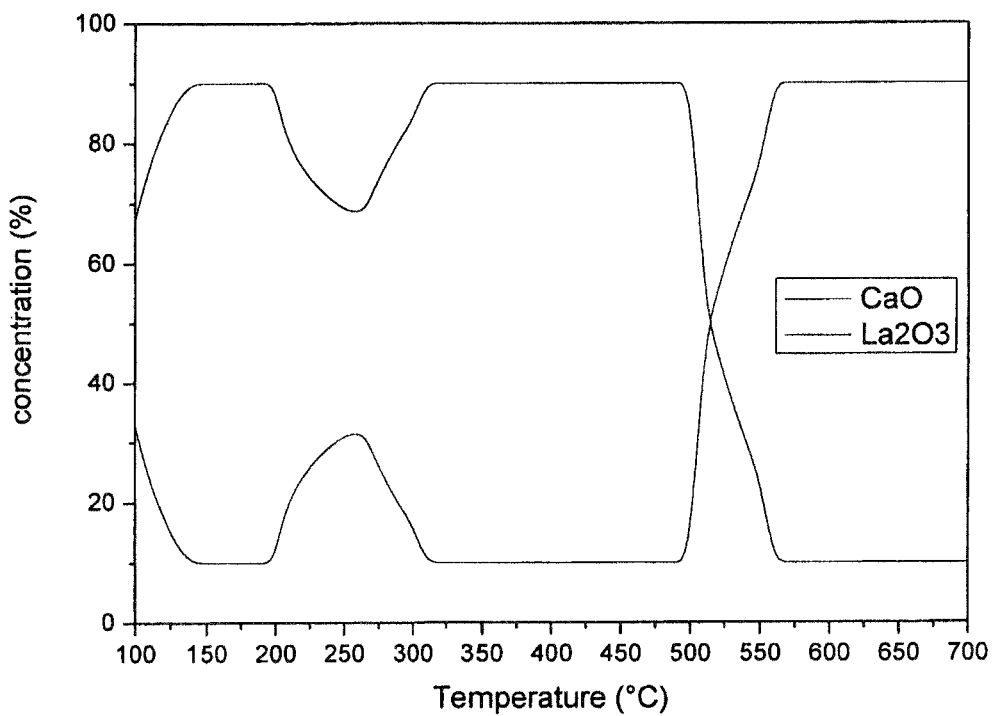
Figure 13 - Material 11 (plaster of paris 10% +CaO+La2O3)

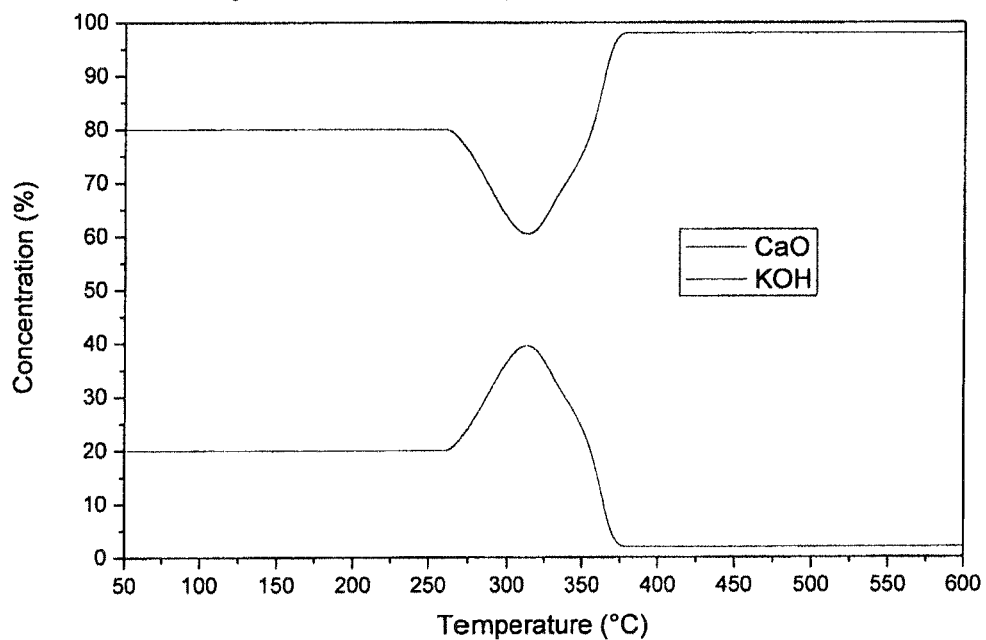
Figure 14 - Material 12 (plaster of paris 10% CaO+KOH)
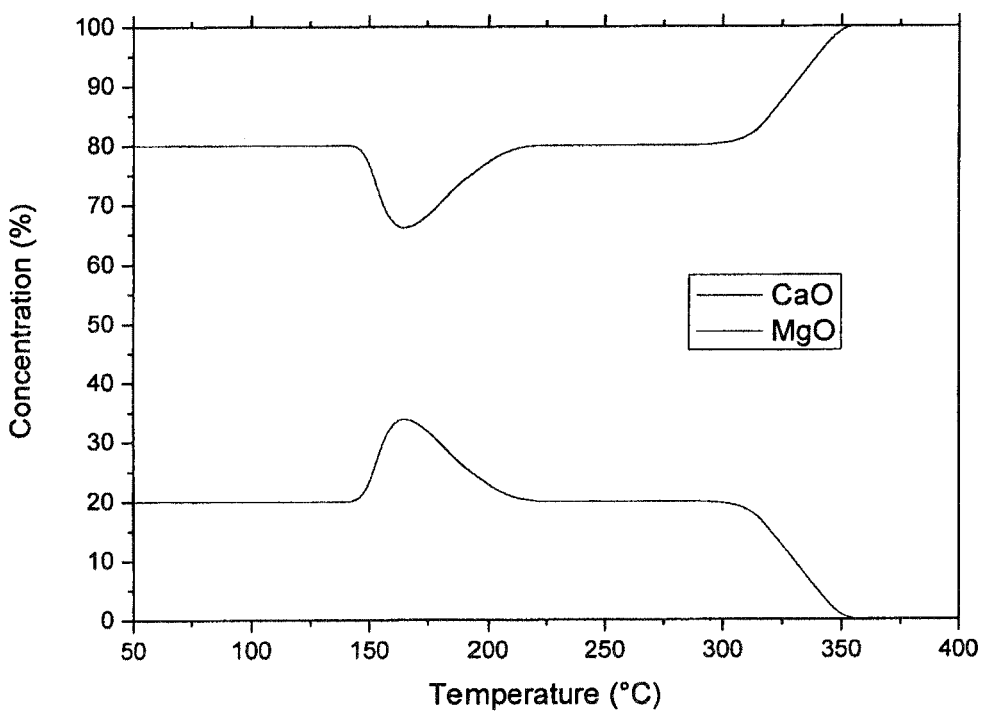
Figure 15 - Material 13 (plaster of paris 10% +CaO+MgO)

CYCLIC PROCESS FOR ABSORPTION AND REGENERATION OF ACIDIC GASES

This application is the U.S. national phase under 35 USC 371 of Intl Application No. PCT/BR2010/000075, filed on 12 Mar. 2010, which designated the U.S., and claims priority benefit of Application Nos. BR PI0903159-6 filed 13 Mar. 2009 and BR 0000220907705453 filed 5 Mar. 2010. The entire contents of each of the foregoing are incorporated by reference herein.

FIELD OF APPLICATION

The present invention describes the process for preparing ceramics for the absorption of ACIDIC gases, which worsen the greenhouse effect, that are released by combustion systems or are present in closed environments. In relation to carbon dioxide, we describe the main goal of the present invention as a process of absorption, transport, processing, and transformation of the gas into other products. The process uses ceramic materials prepared through the solid mixture of one or more metallic oxides with one or more binding agents and an expanding agent. The product thus generated can be processed and the absorbent system regenerated. The carbon dioxide obtained during the processing can be used for either analytic or commercial carbonic gas, various carbamates, and ammonium carbonate.

STATE OF THE ART

The emission of "greenhouse effect" gases such as methane ($CH_4$), carbon dioxide ($CO_2$), sulfur dioxide ($SO_2$), sulfur trioxide ($SO_3$), the nitrogen oxides, as well as hydrocarbon compounds has caused a series of climatic changes that are unfavorable for sustaining life. Phenomena can be cited such as the prolonging of periods of drought, storms of catastrophic dimensions, hurricanes and tornadoes in regions that never had those types of climatic phenomena, in addition to the global rise in the temperature of the atmosphere and of the oceans. Associated with these climatic changes are also the forming of ACIDIC rain that is intensified by the presence of ACIDIC gases and the intrinsic pollution found in the particulate material and toxic substances that make up that part of the atmosphere which makes direct contact with practically every aerobic organism present in the biosphere.

The emission of "greenhouse effect" gases are caused mainly by industrial methods in strategic sectors of the global economy such as steel, concrete, thermoelectric plants, among others. In large urban centers another worsening factor is present, which is the emission of polluting gases provided by methods of transport which use fuels based on carbon (gasoline, diesel, natural gas, alcohol). As they are fuels of fossil origin (gasoline, diesel, coal), they are considerably more polluting than fuels available from renewable sources (alcohol and biodiesel).

Future climatic projections signal the immediate necessity for the implementation of effective procedures to control the emission of polluting gases. The use of environmentally friendly technologies based on solar, hydrogen, wind, and other forms of energy are still out reach for many industrial processes. The use of renewable and carbon-based energy sources, such as ethanol or biodiesel, for example, increase energy efficiency and diminish greenhouse gases emission, principally of carbon dioxide ($CO_2$). However, they will continue to emit an intrinsic amount of $CO_2$ during the burning process, which is an inherent chemical reaction of combustion. The development of this type of technology, focused on the reduction of greenhouse gases emission, has been supported by public policies that set limits for the emission of gases. For example, the European Union established a limit of 120 g/km of $CO_2$ for passenger cars until the year 2012, while the current limit is 160 g/km. Following this limit will result in a 25% reduction of the pollution caused by small vehicles, which currently contribute with approximately 15% of global pollution. Other legislation is focused on establishing maximum limits on emissions from industrial plants, such as the steel and cement industries, in addition to taxes on processing methods related to pollution. However, all of these legal restrictions imposed on production systems that emit greenhouse gases are not sufficient to stop the growing levels of polluting gases that are emitted, as can be verified by reports from the UN (http://www.onu-brasil.org.br, December 2008). It is worth adding that the largest contribution to global pollution comes from industry, which corresponds to approximately 70% (http://gaoli.sites.uol.com.br/arpolu.htm, December 2008) of global pollution.

Still related to the development of incentive policies for the reduction of the emission rates of greenhouse gases, one can look to the KYOTO Protocol which suggests that the more developed countries, which are responsible for more than half the emissions in the world, develop and implement technologies that reduce the quantity of greenhouse gases in their own territories or in other countries. The financing of these technologies is paid through carbon credits, which are defined as one ton of $CO_2$ either not emitted into, or else removed from, the atmosphere as equaling one carbon credit. These are currently (2009) assessed at R$30.00 (http://www.pointcarbon.com/, 27 Oct. 2009). So, businesses that develop environmentally sound methods supported by the KYOTO protocol, or that have among their objectives, the decontamination of the atmosphere, can acquire resources through the sale of carbon credits in stock markets.

The objective of various technologies dedicated to reducing the emission of polluting gases consists of stopping those that are released from entering into the atmosphere through chemical treatments that catch them in a condensed state (liquid or solid).

As carbon dioxide is the main pollutant and the worst contributor to the greenhouse effect, there are various technologies described in the state of the art that propose methods for reducing the quantity emitted. In general, those methods are focused on two objectives, the first relating to the permanent containment of $CO_2$ and the second relating to the reuse of $CO_2$ for the production of useful products and/or of products of industrial interest.

To show the relevance of the process and the complexity of the absorption of ACIDIC gases produced by combustion systems or present in closed environments, various patents, methods, and apparatus can be found in the state of the art. Initially, the objective of the inventions had been the absorption of toxic gases in closed environments such as, for example, submarines and breathing devices with the reflux of anaesthetic gases. To purify the air in submarines (absorption of $CO_2$) the document GB 190603570 (Winand, P.; "Process for the Elimination of Carbon Dioxide from the Gaseous Combustion Products of Combustion Engines", 1906) describes an absorbent mixture of ammonia with sodium oxide or potassium oxide, as they are produced during the making of combustible $O_2$ (for burning) in the internal combustion engines that are designed for the propulsion of submarines. Still related to the atmosphere in submarines, the U.S. Pat. No. 2,545,194 (Colburn, A. P.; Dodge, B.; "Adsorption process for removal of carbon dioxide from the atmosphere of a submarine", 1951) describes only the use of lithium oxide for the absorption of $CO_2$, because a smaller mass is sufficient to maintain the quality of air for the crew. With the development of technologies for the exploration of space, the absorption of $CO_2$ in closed environments assumes a position of higher importance, as is demonstrated by the U.S. Pat. No. 7,326,280 (Hrycak, M. B.; Mckenna, D. B.; "Enhanced carbon dioxide adsorbent", 2005) applied to the purification systems of spacecraft (rockets) and space stations with the use of lithium oxide.

The large-scale application of carbon dioxide absorption processes in closed environments can be demonstrated by U.S. Pat. No. 5,087,597 (Orlando, L. et al.; Carbon dioxide adsorbent and method for producing the adsorbent, 1992) described as having a mixture based on poly(alkoxysilane), silicon, aluminum, and iron oxide, which are used in the absorption of $CO_2$ present in containers used to transport materials susceptible to decomposition in ACIDIC environments or for the transport of animals.

Another highly important application corresponds to the absorption of $CO_2$ in devices for anaesthetic gases. These devices must have a system to absorb $CO_2$ exhaled by the patient; meanwhile, the absorbent materials must not react with the anaesthetic substances, such as occurs in absorbent systems composed of alkaline metals. In this case, the document BR 8613138 (Amstrong, J. R.; Murray, J.; "Absorbing carbon dioxide used in anesthesiology, and a process of preparing the same", 1997) proposes the substitution of lime by a mixture of calcium hydroxide, plaster, aluminum, and a hygroscopic agent (calcium chloride). Similarly, the document RU 2152251 (Imanenkov, S. I.; Aleksandrova, T. I.; Kulakov, N. I.; Putin, B. V.; "Method of synthesis of carbon dioxide adsorbent", 2000) describes the use of a mixture of calcium hydroxide and potassium carbonate for the absorption of $CO_2$ in respiratory devices.

For industrial applications, the absorption processes can be achieved in more varied ways as, for example, described in the document BR 0306705 (Johannes, B. T. et al.; Process for removing carbon dioxide from gas mixtures", 2004) which shows the use of a mixture of water, sulfolane, and an amine secondarily or tertiarily derived from ethanolamine. The absorption process is accomplished by spraying an absorbent solution against a flow of gas containing $CO_2$, $H_2S$ and/or COS. The process that is described can be performed preferably at a temperature between 50° C. and 90° C. For the absorption of $CO_2$ in flowing gases, at an ambient temperature up to about 100° C., various patents can be found that describe the use of zeolites in specific apparatus such as, for example, U.S. Pat. No. 5,531,808 (Ojo A. F.; Fitch, F. R; Buelow, M.; "Removal of carbon dioxide from gas streams", 1996) that uses zeolite-X, and the document EP 0173501 (Keith, P. G.; "Process for removing carbon dioxide from gas mixtures", 1986) that uses zeolite-A. The processes of absorption of $CO_2$ through the zeolites are limited by the range of temperature, owing to the weak interaction that the zeolites present with the absorbed $CO_2$. For higher temperatures, in which the absorption of $CO_2$ occurs, material that does not suffer heat decomposition should be used and, preferably, should be activated by the increase in temperature as, for example, described in the document BR 0003340 for the preparation of a mixture made of magnesium oxide and a carbonate of alkaline metal (Mayorga, S. G. et al.; "Carbon Dioxide absorbents containing magnesium oxide suitable for use under high temperatures, and the manufacturing process", 2000). This mixture absorbs $CO_2$ in a temperature range between 300° C. and 550° C.

In addition to the absorption methods, there also exists the document US 2008086938 (Hazlebeck, D. A.; Dunlop, E. H,; "Photosynthetic carbon dioxide sequestration and pollution abatement"; 2008) that describes using the $CO_2$ produced in industrial plants by injecting it into biodigesters that contain algae which, through the process of photosynthesis, produce biosynthetic fuel oils of industrial interest.

Some palliative methods to block the release of carbon dioxide into the atmosphere can also be found in, for example, the document AU 2008100189 (Ferguson, J. I, S.; "Sequestration of carbon in sinking water" 2008), which suggests a method for making deposits of $CO_2$ at ocean depths between approximately 3,000 and 4,000 meters.

PROBLEM WITH THE STATE OF THE ART

The state of the art for existing technologies to reduce ACIDIC gases is focused on the immobilization and transport of those gases to another place, in such a way that the saturated absorbent material may be discarded.

PROPOSED SOLUTION

The success of the goals and environmental treaties recently proposed will be reached through the development of efficient environmental technologies that make possible the reuse of $CO_2$ and other polluting gases. The present patent request is grounded precisely in this view. Through the use of absorbent ceramics for ACIDIC gases, this patent aims at making a complete cycle between the absorption and the storage of ACIDIC gases, finally turning them into useful products for various sectors such as, for example, the agricultural and chemical industries. This absorption cycle returns the mass of emitted pollutants to industrial applications, with the simultaneous recovery of part of the absorbent material. When this cycle is not performed, the polluting material is only immobilized and transported to another place, that is, the pollution is merely transferred to another location. Aside from the creation of waste deposits of saturated absorbent material, however, there is no serious environmental impact because the material that is formed is inert in the environment. Meanwhile, the methods that are available so far are ineffective since they only relocate the pollutant material, for example, the ACIDIC gases. The present invention covers exactly this gap, proposing a complete cycle that permits storage, transport, and regeneration of the absorbed ACIDIC gases for use in various applications. It is important to emphasize the low cost of the method proposed, and environmental correctness, as it is inert in the environment.

DETAILED DESCRIPTION OF THE INVENTION

The present invention describes a method for reducing the emission of ACIDIC gases and contributors to the greenhouse effect that are released by combustion systems and industrial plants such as in the steel, cement, and thermoelectric industries, or systems of gas purification. The absorbent material, after its saturation by ACIDIC gases, is then processed thermally or chemically, generating a flow of purified gas which is then used in processes of the synthesis of various useful products such as analytical or commercial compressed gas; useful products for the chemical industry for the synthesis of carbonates and related ACIDICs; and useful products for the agricultural industry with the manufacture of carbonates, nitrates, sulfates and sulfites. The thermal or chemical processing has the capacity to regenerate the absorbent material, thus creating a cycle of atmospheric cleansing with the generation of useful products relevant to the various industrial sectors, at a low cost.

The present invention proposes absorbent mixtures containing oxides of alkaline earth metals, alkaline metals or transition metals that show a kinetic reaction favorable to the absorption of carbon dioxide and other ACIDIC gases such as, but not limited to, $SO_2$, $SO_3$, NO and $NO_2$. The proposed absorbent mixtures also contain a binding (hardener) agent and an expanding agent. The different compositions represented have the property of absorbing ACIDIC gases at different temperatures, which can vary from 25° C. to 700° C., as shown below.

Some forms of absorbent mixtures described in the present patent request have the capacity to absorb ACIDIC gases in different environments and under various thermodynamic conditions. Therefore, they are effective in diverse situations such as when rapid or moderate absorption is necessary, as well as those in which an extremely slow absorption is necessary. Therefore, the method proposed in the present invention shows control that is as much thermodynamic as kinetic. In this way, the proposed technology can be applied to the decontamination of closed environments in ambient temperatures (~25° C.); purification of flowing gases; the absorption of industrially rejected gases (exhaust systems) at temperatures between 50° C. and 600° C., such as in the production of coke, sintering of materials, lamination; the absorption of ACIDIC gases released during the burning of fuels in internal combustion engines, in addition to the intake airflow of internal combustion engines; and energy production through thermoelectrics, all aiming at improving the efficiency of the process of burning fuels.

The operating cycle of absorbent materials is illustrated in FIG. 1. This illustration makes it possible to observe the ideal coupling between the absorption process of polluting gases of ACIDIC nature with methods of reusing the absorbent material having the capacity to reduce and even extinguish the emission of ACIDIC gases in combustion systems such as furnaces that burn fuel, internal combustion engines, and industrial plants. The method proposes a cycle of reusing the absorbent material which, after its saturation, is collected, exchanged, and analyzed in order to determine the composition of the absorbed gases. Next, aside from its composition, the saturated material is brought to an industrial plant outfitted for the recovery of the absorbed gas, transforming it into industrial useful material, totally or partially regenerating the absorbent material.

The present invention describes the use of a solid mixture composed of one or more oxides of alkaline earth metals, one or more hydroxides of alkaline metals, and oxides of transition metals, enhanced with a binding agent and an expanding agent. The mixture of these components must be done in an aqueous medium so that the final solid acquires its consistency, and is expanded uniformly, through the action of the binding and the expanding agent. After the complete homogenization of the components, the mixture is left to settle for a period of 1 to 5 hours so that the expanding agent, such as pulverized metallic aluminum or calcium oxalate, can act to generate bubbles uniformly throughout the entire mass. The reaction of the expanding agent occurs slightly before that of the binding agent, thus permitting the formation of bubbles that will be structurally maintained through the gradual, subsequent activation of the hardening/binding agent, such as: magnesium oxide, bentonite, kaolin, or Plaster of Paris. After a partial hardening of the mixture, it is submitted to a process of moderate heating (100° C.-200° C.) for a period from 3 to 72 hours, although not limited to it, to eliminate the excess water. It is subjected thereafter to intense heating (between 500° C. and 800° C., although not limited to it) for a period of 1 hour, although not limited to it, that guarantees the hardening of the mixture. This heating must be done in the presence of nitrogen or in the absence of airflow; or, in a closed chamber or in the absence of ACIDIC gases that could be absorbed during the synthesis of the material.

In the stage following the homogenization, the material can be shaped into specific forms, for example, compact blocks, cast blocks (bricks), or pellets of varying sizes (5 a 20 mm), among others. For the shaping of blocks (compact or cast) the mixture can have a more fluid consistency by the addition of excess water, facilitating its homogenization. In this case, you can also use a larger amount of expanding agent in order to increase the area and the efficiency of the absorption process. For the shaping of the pellets, the initial mixture must have a more pasty consistency that makes the manufacture of the pellets possible, which next should be submitted to heating to stop the recombining of the material.

The intense heating stage can be done in an autoclave at a lower temperature, approximately 200° C. The process guarantees greater rigidity of the formed solid, giving it greater mechanical resistance.

The absorbent material described in this patent request shows a basic (Translater's Note: opposite of ACIDIC) character, allowing its use in processes of the absorption of ACIDIC gases such as carbon dioxide ($CO_2$), sulfur dioxide ($SO_2$), sulfur trioxide ($SO_3$), among others. Although all the gases mentioned worsen the greenhouse effect and ACIDIC rains, it is carbon dioxide that appears to be the main pollutant, owing mostly to the increased quantity produced in industries that use combustion processes. Thus, $CO_2$ will be used in examples showing the reactions and illustrating the efficiency of the process of absorption to reduce the emissions of gases which worsen the greenhouse effect. It will show the subsequent use of the material formed from the regeneration of the absorbent ceramic, and the creation of important products of high aggregate value, for various industrial sectors.

The potential for the absorption of materials is determined by the kinetic reaction of the gas with the existing oxides. Hence, every mixture has a range of ideal temperatures for absorption, and the speed of absorption depends on the composition, the temperature, and the flow of gas over the material. The ranges of absorbent temperatures and the conditions of regeneration of materials are discussed below, individually, for each type of composition. As previously described, the main focus of this current invention is the absorption of carbon dioxide, among others; therefore, the equations below show the chemical reactions that occur during the process of absorption of the CO2, aside from the absorbent mixture containing calcium oxide and potassium hydroxide, among others.

$$CO_{2(g)} + CaO_{(s)} \rightarrow CaCO_{3(s)}$$

$$CO_{2(g)} + 2KOH_{(s)} \rightarrow K_2CO_{3(s)} + H_2O_{(g)}$$

The absorbent material makes the transport and the concentration of the absorbed gases for industrial installations which are suitable for its processing. The recovery of carbon dioxide can be done through the thermal decomposition of the material, or from chemical treatment with nitric ACIDIC, among others, and subsequent regeneration of absorbent material through the addition of sodium hydroxide, among others, in the presence of 1-2% of aluminum, among others. The mixture that is formed is filtered and heated to 100° C. in order to eliminate water, thus regenerating the absorbent material.

The carbon dioxide that is formed from the saturated absorbent ceramic shows an elevated concentration, making possible various industrial methods. Initially, that same carbon dioxide can be compressed and bottled for its subsequent commercialization as an analytic reagent, or in distinct processes that use $CO_2$ gas. In addition to this direct application of the $CO_2$ that was absorbed from polluting industrial plants, two more methods, among others, are proposed in this patent request for the chemical transformation of carbon dioxide into various carbonates and carbamates, among others.

The carbon dioxide gas can be injected into a basic solution of sodium hydroxide or ammonium hydroxide, among others. The chemical reactions for those processes are shown in equations 1 and 2 (Eq. 1 and Eq. 2). After the formation of the carbonate, the solution of sodium carbonate is heated until the water is completely evaporated (approximately 100° C.), and the ammonium carbonate (when the basic solution that is used is ammonium hydroxide) is left to evaporate at 40° C. to avoid the sublimation of the desired material, leaving only the carbonate corresponding to the base utilized.

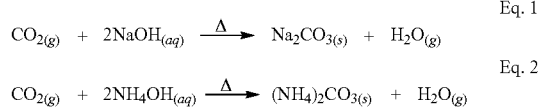

Eq. 1

Eq. 2

The synthesis of ammonium carbamate can be done at room temperature by passing a stream of $CO_2$ through a container with liquid ammonia. The reaction is kinetically favorable, as the immediate formation of a white solid is observable. Following this, the system is kept still and the carbamate can be separated through filtering or decantation, among others. The corresponding reaction for this process is shown in the following chemical equation (Eq. 3).

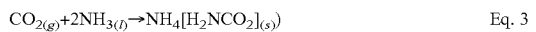

Eq. 3

In case the $CO_2$ is collected in a container with a basic aqueous solution or a suspension of secondary amines, $HNR_2$, the carbamate of alkaline metals or of corresponding ammonia can finally be obtained, according to the following equation (Eq. 4).

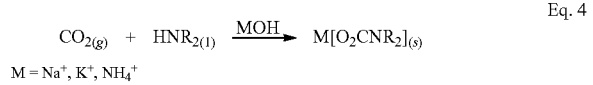

Eq. 4

EXAMPLE 1

Preparation of Class 1 Absorbent Material: Test of the Speed of Absorption and Saturation Time to 90%

The Class 1 absorbent ceramics use MgO as the binding agent, with a concentration of up to 10% (p/p) and aluminum powder as the expanding agent, with a concentration up to 1%. The rest of the mixture, which corresponds to the absorbent components, is composed of mixtures of CaO and $La_2O_3$ (FIG. 3), CaO and KOH (FIG. 4), CaO and MgO (FIG. 5), MgO and KOH (FIG. 6) with the proportions in defined amounts for every range of temperature in which the absorption process is more intense than the thermal decomposition process of the saturated material. The mixtures containing magnesium absorb more effectively between 50 and 400° C. while the mixtures $CaO+La_2O_3$ and CaO+KOH can be used in the absorption process between 100 and 700° C. The use of MgO as binding agent gives the material superior mechanical resistance in relation to the binders bentonite and kaolin as, for example, a sphere of approximately 5 mm diameter, containing CaO 75% and MgO 25%, resists up to 55N.

For the Class 1 compositions, the potential for absorption is maximized because the binding material (MgO) also has the capacity to absorb $CO_2$.

Based on the kinetic study of the Class 1 materials it was possible to estimate the storage time ($t_{90}$) of the absorbent materials, i.e., the time for the consumption of 10% of the stored material in ambient conditions for the composites with CaO content greater than or equal to 80%, to be approximately 15 days. This makes possible the storage and transportation of the ceramic material for industrial installation where it will be used for the absorption of $CO_2$.

EXAMPLE 2

Preparation of Class 2 Absorbent Material: Bentonite

The Class 2 absorbent ceramics use bentonite as the binding agent with concentration of up to 10% (p/p), and aluminum powder as the expanding agent with concentration of up to 1%. The rest of the mixture, which corresponds to the absorbent components, is composed of binary mixtures of CaO and $La_2O_3$ (FIG. 7), CaO and KOH (FIG. 8), CaO the MgO (FIG. 9).

Bentonite is made of 66.9% $SiO_2$, 16.3% $Al_2O_3$ and 6% $H_2O$; with the most common impurities being $Fe_2O_3$ (~3.3%), NaOH (2.6%), $Ca(OH)_2$ (1.8%) and $Mg(OH)_2$ (1.5%). As mentioned previously, the mechanical resistance of the material using bentonite (Table 1) is poorer compared to MgO as a binding agent, but that does not prevent its use as a structuring agent for absorbent mixtures of $CO_2$. In the same way, the compositions containing CaO+KOH or $CaO+La_2O_3$ absorb in a range of higher temperature (100 to 700° C.), while the mixture CaO+MgO can absorb between 50 and 400° C.

TABLE 1

Content of bentonite and mechanical resistance for mixtures containing 80% or more of CaO

| Content of bentonite (% p/p) | Resistance (N) | Diameter of the sphere (mm) |
| --- | --- | --- |
| 10 | 31 | 5.8 |
| 8 | 44 | 6.0 |
| 6 | 41 | 7.4 |
| 4 | 35 | 6.9 |
| 2 | 28 | 6.5 |

EXAMPLE 3

Preparation of Class 3 Absorbent Material: Kaolin

Class 3 ceramic absorbents use kaolin as the binding agent with a concentration of up to 10% (p/p) and aluminum powder as expanding agent with a concentration of up to 1%. The rest of the mixture, which corresponds to absorbent components, is composed of binary mixtures of CaO and $La_2O_3$ (FIG. 10), CaO and KOH (FIG. 11), CaO and MgO (FIG. 12). This class of materials shows physical and kinetic properties similar to Class 2. Kaolin corresponds to a mixture of aluminosilicates with the empirical formula $Al_2O_3 \cdot mSiO_2 \cdot nH_2O$, in which m can assume values from 1 to 3 and n can vary between 2 and 4.

To exemplify the efficiency and the speed of the absorption of the Class 2 materials, a composition containing 88.5% CaO, 1% KOH, 10% kaolin and 1% aluminum was used. The absorption experiment was performed with a flow of $CO_2$ proportional to the mass of the absorbent, including 26 grams of $CO_2$ per minute per gram of ceramic material (26 g·min$^{-1}$g$^{-1}$). The average speeds of $CO_2$ absorption, at different temperatures for the analyzed mixtures, are found in Table 4, along with the time for saturation of 90% of the material. In composites containing higher KOH content, the speed of absorption increases considerably, up to 10% faster, however, due to the stoichiometric proportions of the material, efficiency is impaired.

TABLE 2

Speed of absorption and time to saturation for 90% of the ceramic material composed of 88.5% CaO, 0.5% KOH, 10% kaolin and 1% aluminum with exposure to a flow of $CO_2$ from 26 g · min$^{-1}$kg$^{-1}$ per gram of absorbent material.

| Temperature (° C.) | Speed (g · min$^{-1}$kg$^{-1}$) | Time ~90% (min) |
|---|---|---|
| 200 | 1.2 | 576 |
| 300 | 12.2 | 57 |
| 400 | 38.6 | 18 |
| 500 | 49.7 | 14 |
| 600 | 189.0 | 4 |

EXAMPLE 4

Preparation of Class 4 Absorbent Material: Plaster

Class 4 absorbent ceramics use Plaster of Paris as binding agent with a concentration of up to 10% (p/p) and aluminum powder as expanding agent with a concentration of up to 1%. The rest of the mixture, which corresponds to the absorbent components, is composed of binary mixtures of CaO and $La_2O_3$ (FIG. 13), CaO and KOH (FIG. 14), CaO and MgO (FIG. 15).

Mixtures with a quantity of less than 5% of plaster lose their rigidity, damaging the handling of the material. An inverse relation between the aluminum content and rigidity can be observed, because the excessive increase in the quantity of bubbles in the structure of the material demands a greater amount of binding agent (plaster). For the process of absorbing the carbon dioxide, the temperature of decomposition of calcium carbonate in the mixture must be higher than 750° C. The process of regenerating the material demands the addition of an expanding agent (aluminum), reducing thus the concentration of the binding agent and absorbent in approximately 1 to 2% for every cycle. Therefore, considering the minimum concentration of calcium oxide and Plaster of Paris, every mixture makes it possible to perform approximately 5 cycles of absorption/regeneration with no considerable loss of efficiency and mechanical resistance of the material. Calcium oxalate can be used as the expanding agent although it is necessary to treat it thermally so that, through the decomposition of oxalate to calcium oxide, the carbon dioxide generated causes the aeration of the material. In this process, the carbon dioxide needs to be transformed into useful products in the initial process of the preparation of the ceramic.

EXAMPLE 5

$CO_2$ Absorption Test

To verify the absorption process, a chainsaw two-stroke engine, which uses a composite fuel containing 96% gasoline and 4% oil, was used. A Class 2 ceramic, composed of 88% CaO, 1% KOH, 10% kaolin and 2% aluminum was placed in a tubular furnace at 500° C., in a hood with an exhaust system. Then, the motor was started and the discharged gases were directed to the entrance of the furnace to allow contact of those gases and the ceramic at the temperature of the furnace. After about 1 hour, the furnace and the engine were shut off. The material obtained was weighed comparing the difference in mass in relation to the original mass of the ceramic. A gain in mass showing a 40% absorption was verified. An elemental analysis of carbon and nitrogen showed an additional mass related to these elements of about 45% carbon coming from the $CO_2$, and less than 1% nitrogen coming from the nitrogen oxides.

BRIEF DESCRIPTION OF THE DRAWINGS

FIG. 1 outlines the cyclical process proposed in the patent request for the absorption of ACIDIC gases and the reuse of them for the synthesis of useful products, regenerating the absorbent material. The process begins with the preparation of the absorbent material (101), which is made of two or more oxides of alkaline earth metals or earth alkaline with alkaline oxide, binding agents and expanding agents. The absorbent ceramic is then exposed to a flow of gas, at a temperature between 50 and 600° C. (110), the saturated material is exchanged (112) and analyzed (113) in order to determine the type of process that was used in its processing (120), yielding for each composition one or more types of useful products (121). During the processing of the saturated material, the absorbent ceramic can be regenerated (130) by recomposition and shaped again (140) being, therefore, ready to be reused in the absorption of ACIDIC gases.

FIG. 2 highlights the process of recovering the ceramic materials described in the present patent request after saturation with carbon dioxide, which does not limit the use of the absorbent materials, which can be used for any gas of an ACIDIC nature. Initially, the absorbent ceramic (200) is exposed to a flow of $CO_2$ at a temperature between 100 and 600° C. The saturated material (210) can be processed in two distinct ways. The first way corresponds to the thermal decomposition of the carbonates produced at a temperature of approximately 800° C. (260). In this way, the released $CO_2$ (250) is brought to the processing systems of industrial interest. The carbon dioxide can be stored (251) or transformed into other products such as carbonate (252) and carbamate (253). The flow of $CO_2$, which has an elevated percentage of concentration, can be used in the production of ammonium carbamate or various other carbonates such as ammonium carbonate or sodium carbonate. The carbon dioxide (250) can also be regenerated through the reaction of the saturated material (210) with an ACIDIC (220) such as nitric ACIDIC, among others. The remaining mixture produced is alkalinized by the addition of NaOH (230), turning the alkaline earth metal hydroxides and other insoluble hydroxides into precipitates, enabling the separation by filtering or decantation. Then, pulverized aluminum is added to complete the process of expanding the mass. Finally, the material is heated to remove excess water (240) and for the hardening of the ceramic material, which is available to restart the cycle of absorption and the use of carbon dioxide.

FIG. 3 corresponds to the composition of the mixture that is best suited to each temperature, and which uses MgO as binding agent forming CaO and $La_2O_3$.

FIG. 4 corresponds to the composition of the mixture that is best suited to each temperature, and which uses MgO as binding agent forming CaO and KOH.

FIG. 5 corresponds to the composition of the mixture that is best suited to each temperature, and which uses MgO as binding agent forming CaO and MgO.

FIG. 6 corresponds to the composition of the mixture that is best suited to each temperature, and which uses MgO as binding agent forming MgO and KOH.

FIG. 7 corresponds to the composition of the mixture of the absorbents comprising CaO and $La_2O_3$, and which are enriched through the addition of bentonite in temperature ranges at which they can absorb $CO_2$.

FIG. 8 corresponds to the composition of the mixture of the absorbents comprising CaO and MgO, and which are enriched through the addition of bentonite in temperature ranges at which they can absorb $CO_2$.

FIG. 9 corresponds to the composition of the mixture of the absorbents comprising CaO and KOH, and which are enriched through the addition of bentonite in temperature ranges at which they can absorb $CO_2$.

FIG. 10 shows the composition of material containing kaolin, used for enrichment, comprising CaO and $La_2O_3$.

FIG. 11 shows the composition of material containing kaolin, used for enrichment, comprising CaO and KOH.

FIG. 12 shows the composition of material containing kaolin, used for enrichment, comprising CaO and MgO.

FIG. 13 correlates the composition of the absorbent material with mixtures containing up to 10% Plaster of Paris comprising CaO and $La_2O_3$, for all ranges of temperature at which it is possible to use these materials.

FIG. 14 correlates the composition of the absorbent material with mixtures containing up to 10% Plaster of Paris comprising CaO and KOH, for all ranges of temperature at which it is possible to use these materials.

FIG. 15 correlates the composition of the absorbent material with mixtures containing up to 10% Plaster of Paris comprising CaO and MgO, for all ranges of temperature at which it is possible to use these materials.

Figure 1:
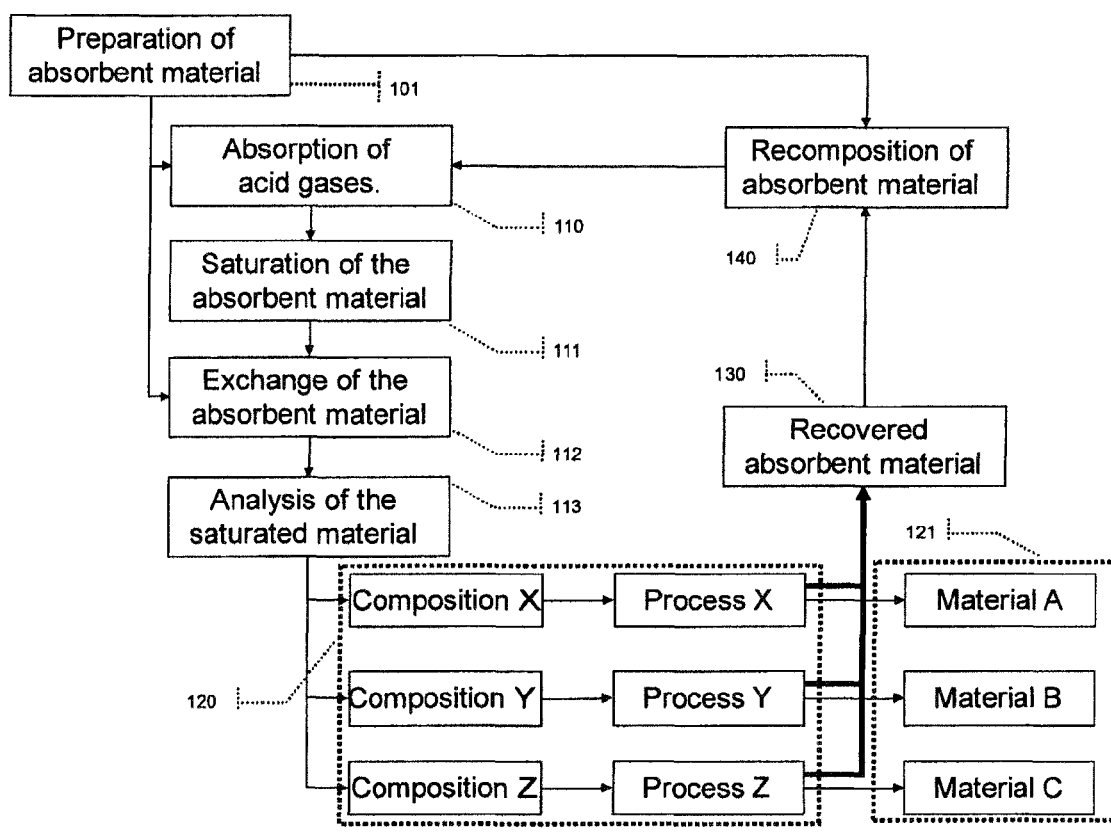
FIG. 1 describes the absorption cycle, the production of useful products and the recovery of absorbent materials.
Figure 2:
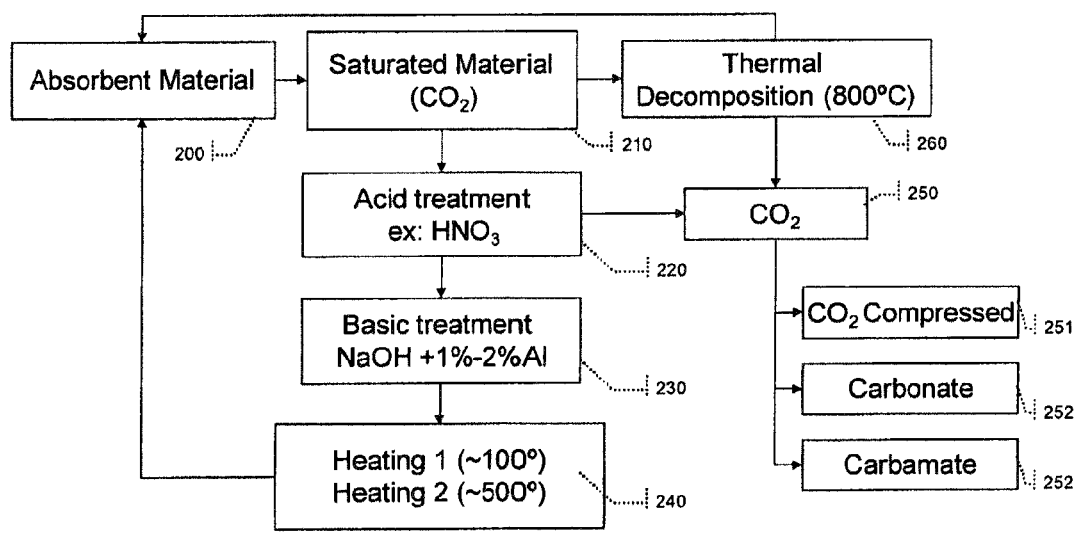
FIG. 2 describes processes of regenerating absorbed carbon dioxide and the regeneration of absorbent material.
Figure 2:
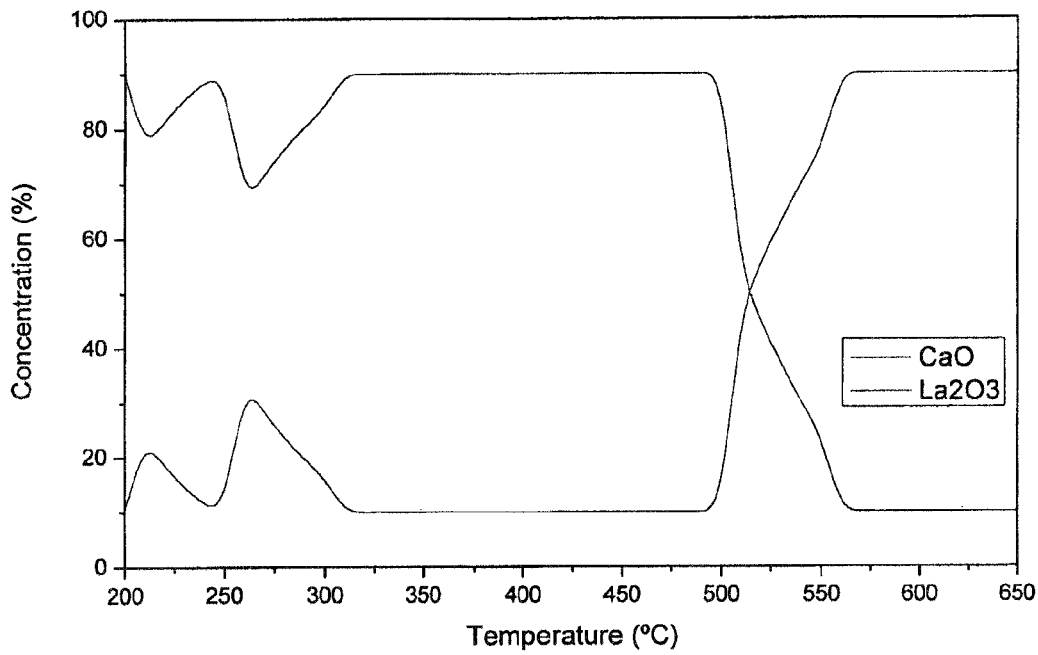

The invention claimed is:

1. A cyclic process for preparation and use of ceramic material for absorption of acidic gases, comprising: preparation of absorbent material, absorption of acidic gases, saturation of absorbent material, exchange of absorbent material, analysis of the saturated material, processing of materials, obtaining of productions input, regeneration of recovered material, and recomposition of the absorbent material.

2. The cyclic process according to claim 1, wherein the preparation of the material comprises the following steps:
 a) mixture of components: absorbent agents, binding agent and expanding agent, in an aqueous medium;
 b) rest of the mixture for a period of 1 to 5 hours;
 c) activation of the expanding agent through homogenization of the mixture;
 d) moderate heating of the mixture to a temperature between 100 and 200° C., for a period between 3 and 72 hours; and
 e) intense heating of the mixture in the presence of nitrogen or in the absence of airflow, immediately afterward moderated heating at a temperature between 500 and 800° C., for a period of approximately 1 hour or in an autoclave at a lower temperature of approximately 200° C.

3. The cyclic process according to claim 2, comprising the capability of the material to be molded into specific forms afterwards the homogenization, step "c", such as compact blocks, cast blocks (bricks) or pellets of varying sizes.

* * * * *